United States Patent [19]

Siriwardane

[11] Patent Number: 5,494,880
[45] Date of Patent: Feb. 27, 1996

[54] DURABLE ZINC OXIDE-CONTAINING SORBENTS FOR COAL GAS DESULFURIZATION

[75] Inventor: Ranjani V. Siriwardane, Morgantown, W. Va.

[73] Assignee: The United States of America as represented by the United States Department of Energy, Washington, D.C.

[21] Appl. No.: 216,392

[22] Filed: Mar. 23, 1994

[51] Int. Cl.$^6$ .............................. B01J 20/02; B01J 20/30
[52] U.S. Cl. .......................... 502/400; 502/405; 502/407; 502/411; 502/428; 502/517
[58] Field of Search ..................... 502/517, 429, 502/428, 411, 405, 400, 407; 423/230

[56] References Cited

U.S. PATENT DOCUMENTS

| | | | |
|---|---|---|---|
| 3,518,206 | 6/1970 | Sowards et al. | 252/446 |
| 4,059,418 | 11/1977 | Cull | 55/73 |
| 4,076,651 | 2/1978 | Jacques | 252/451 |
| 4,180,549 | 12/1979 | Olsson et al. | 423/230 |
| 4,732,888 | 5/1988 | Jha et al. | 502/423 |
| 5,045,522 | 9/1991 | Kidd | 502/405 |
| 5,130,288 | 7/1992 | Delzer et al. | 502/405 |
| 5,177,050 | 1/1993 | Schubert | 502/415 |
| 5,254,516 | 10/1993 | Gupta et al. | 502/84 |

FOREIGN PATENT DOCUMENTS

| | | | |
|---|---|---|---|
| 2127002 | 4/1984 | United Kingdom | 423/338 |

*Primary Examiner*—Gary P. Straub
*Assistant Examiner*—Timothy C. Vanoy
*Attorney, Agent, or Firm*—David E. Breeden; Stephen D. Hamel; William R. Moser

[57] ABSTRACT

Durable zinc-oxide containing sorbent pellets for removing hydrogen sulfide from a gas stream at an elevated temperature are made up to contain titania as a diluent, high-surface-area silica gel, and a binder. These materials are mixed, moistened, and formed into pellets, which are then dried and calcined. The resulting pellets undergo repeated cycles of sulfidation and regeneration without loss of reactivity and without mechanical degradation. Regeneration of the pellets is carried out by contacting the bed with an oxidizing gas mixture.

7 Claims, No Drawings

DURABLE ZINC OXIDE-CONTAINING SORBENTS FOR COAL GAS DESULFURIZATION

The United States Government has rights in this invention pursuant to the employer-employee relationship of the U.S. Department of Energy and the inventor.

BACKGROUND OF THE INVENTION

This invention relates generally to sorbents for removing hydrogen sulfide from hot gas mixtures containing the same and more particularly to metal oxide sorbents for removing hydrogen sulfide from a stream of hot gases produced in gasification of coal.

One of the most promising approaches to producing electrical energy from coal is the integrated gasification combined cycle since it can provide economically and environmentally sound systems which operate with improved thermal efficiency. However, when coal is gasified, sulfur, which is present in most coals, is converted to sulfur-bearing pollutant gases, in particular, hydrogen sulfide. This gas is highly toxic, and its release is unacceptable from the environmental point of view. In addition, it is necessary to protect turbines and related equipment from its corrosive action. Thus, removal of hydrogen sulfide from the coal gasification process stream is essential.

Removal of hydrogen sulfide by previously known low-temperature methods such as scrubbing is not practical because the required low temperatures would impose a severe thermal penalty. For the integrated gasification combined cycle, desulfurization has to be performed at a high temperature typically over 1,000° F. and, in some cases, at a high pressure. A preferred method for removal of hydrogen sulfide would be to contact the gas stream with a sorbent capable of undergoing many cycles of sulfidation and regeneration by means of oxidation. This requires a sorbent which is operational at high temperatures in the presence of reducing gas such as hydrogen and carbon monoxide and which is both mechanically and chemically durable for a prolonged period.

Various metal oxides and related compounds have been tested in the past as sorbents for removal of hydrogen sulfide from a coal gasification stream. In particular, oxides such as iron oxide, copper oxide, and zinc oxide have been used, along with other zinc-based sorbents including zinc ferrite and zinc titanate. While these materials typically show a high initial reactivity with hydrogen sulfide at temperature ranges of interest, they undergo a continuing decrease in reactivity and mechanical deterioration of sorbent pellets due to spalling during repeated cycles of absorption and regeneration, making them undesirable for use in a practical process. Durable sorbent pellets that show a prolonged period of high reactivity with hydrogen sulfide along with resistance to spalling during repeated operating cycles of sulfication and regeneration are therefore needed.

SUMMARY OF THE INVENTION

The present invention is directed to durable sorbent pellets for absorbing hydrogen sulfide comprising a mixture of a sorbent oxide with an effective stabilizing amount of an inert refractory oxide and porous silica, secured together with one or more suitable binders. The pellets are formed under conditions such that a chemical reaction of the sorbent oxide with the inert oxide component is avoided, thus retaining high reactivity of the sorbent oxide with hydrogen sulfide. Improved chemical and mechanical stability of the pellets are believed to result from the stabilizing effect of the inert oxide, combined with more effective contact with the gas stream enabled by the porous silica component. This provides a high surface area and large numbers of paths for passage of the gas stream. The pellets may comprise zinc oxide as the reactive sorbent and titania as the inert oxide diluent.

Tests have demonstrated that pellets made according to the invention maintain a high degree of stability of reactivity during continuous sulfidation/regeneration cycles, as well as a lack of spalling, cracking, or other changes in physical characteristics.

It is therefore an object of this invention to provide oxide-based sorbent pellets that show high reactivity toward hydrogen sulfide over a prolonged period of sulfidation and regeneration cycles.

Another object is to provide durable zinc oxide-based pellets resistant to mechanical degradation over repeated process cycles.

Still another object is to provide zinc oxide-based sorbent pellets with a high surface area and a high degree of internal porosity.

A further object is to provide a method of making such pellets.

Other objects and advantages of the invention will be apparent from the following detailed description and the appended claims.

DETAILED DESCRIPTION OF THE INVENTION

The sorbent oxide component of the pellets of the present invention may comprise a metal oxide reactive with hydrogen sulfide in a gas stream at a selected high temperature. Zinc oxide is preferred for use over its effective temperature range of 800° F. to 1,200° F. If operation at higher temperatures is necessary, a sorbent metal oxide such as manganese oxide or copper oxide which can tolerate higher temperatures may be used. If lower temperatures are required, a metal oxide such as iron oxide which is reactive at lower temperatures may be substituted for zinc oxide. The reactive metal oxide is preferably provided in the pellet mixture at a concentration of 30 to 60 weight percent. A particle size of <45 microns is preferred for zinc oxide.

The inert refractory oxide preferably comprises titania owing to its high degree of stability at the temperature range of interest when combined with zinc oxide. In addition to serving as a diluent, titania is believed to contribute to the strength of the pellets. Titania may be used at a concentration of 0 to 40 weight percent, with 20 to 40 percent being preferred. A very small particle size of 1 to 2 microns is also preferred for the titania. Other inert refractory materials which do not affect the reaction with hydrogen sulfide may be used in place of titania.

Silica gel is included in the pellets to impart a high porosity and high surface area to the pellets, providing enhanced reactivity along with resistance to spalling. Selection of proper size fractions of the silica gel is important to achieving this result. Best results may be obtained by using equal amounts of 40 to 50 mesh silica gel particles and −100 mesh particles for fixed bed applications in which the pellets are bigger than 1 mm. For fluid bed type applications in which the pellets are less than 500 microns, smaller size silica gel particles (<−100 mesh) may be utilized. Silica gel may be provided at an overall concentration of 5 to 40 weight percent in the pellets. Other inert materials with a high surface area may also be used.

The above ingredients are combined with a suitable binder to form highly durable pellets. Clay binders such as Bentonite along with calcium sulfate for additional binding effect may be used for this purpose. It is preferred to use both of these materials, each at a concentration of 2 to 15 weight percent. Other clay binders may also be used. Pellets embodying the invention may be formed by combining the ingredients in the form of granules or particles and adding a sufficient amount of water to cause the pellets to adhere together. Conventional mixer-pelletizer equipment may be used for this purpose. The pellets are preferably made in the form of spheres 0.2 to 0.5 inch in diameter, although other sizes and shapes such as cylindrical may also be used. The pellets are then dried and calcined at an elevated temperature to convert them to durable form. Prolonged heating in a vacuum oven, for example, at 150° C. for 2 hours and 100° C. for 20 hours may be employed, followed by calcining at 550° C. for 10 hours. Pellets made under these conditions and including the preferred ingredients discussed above showed a BET nitrogen surface average of 26 $m^2/g$, as compared to surface areas of 1 to 4 $m^2/g$ for zinc titanate and zinc ferrite pellets made previously.

The invention is further illustrated by the following examples.

EXAMPLE 1

Sorbent 1 pellets were prepared by solid-state mixing of the following materials in a mixer-pelletizer, followed by addition of a sufficient amount of water for pelletizing.

| | |
|---|---|
| Zinc oxide (−325 mesh, <45 microns) powder | 2,000 grams |
| Titanium oxide (1.5–2.0 microns) | 982 grams |
| Silica gel desiccant (surface area 700 $m^2/g$) | |
| 40–50 mesh | 119 grams |
| −100 mesh | 119 grams |
| Bentonite | 298 grams |
| Calcium sulfate | 149 grams |

The pellets were formed in spherical shape (irregular) with a diameter of 0.2 to 0.5 inch.

The resulting pellets were heated in a vacuum oven at 150° C. for 2 hours and then at 100° C. for 20 hours. The pellets were calcined at 550° C. for 10 hours. The BET nitrogen surface area of the resulting solid was 26 $m^2/g$.

Ten sulfidation and regeneration cycle tests using these pellets (0.2 inch diameter) were performed in a low-pressure fixed bed reactor (1" diameter×3" length) at 537° C. The composition of the gases was 0.2 (volume percent) $H_2S$, 12.5 CO, 13.8% $H_2$, 19% $H_2O$, 1% $CH_4$, and 11% $CO_2$. The total gas flow rate was 964 cc/min, and the space velocity was 2,000 $h^{-1}$. The reactor inlet pressure was 15 psig. Breakthrough curves (plots of hydrogen sulfide concentration at the reactor outlet vs. time) were obtained for hydrogen sulfide, and the breakthrough time was defined as the time corresponding to 200 ppmv $H_2S$ in the outlet gas. Regeneration of the sorbent was performed at 537° C. to 704° C. utilizing air, nitrogen, and oxygen. The total gas flow rate regeneration was performed at five different stages with air:nitrogen:oxygen concentrations varying from 6.88:282.3:0.05 cc/min to 289.9:0:21.0. Regeneration was stopped when the $SO_2$ concentration in the outlet gas was 50 ppmv.

The results of the ten cycle sulfidation/regeneration tests with 2,000 ppm $H_2S$ are listed below.

| Sulfidation Cycle | Breakthrough Time (min) |
|---|---|
| 1 | 665 |
| 2 | 840 |
| 3 | 1,140 |
| 4 | 1,145 |
| 5 | 1,290 |
| 6 | 1,560 |
| 7 | 1,440 |
| 8 | 1,380 |
| 9 | 1,335 |
| 10 | 1,125 |

The breakthrough time defined as the time corresponding to 200 ppmv $H_2S$ increased at each sulfidation cycle up to the fifth cycle (S5) and reached stabilization. The breakthrough times after reaching stabilization at the fifth cycle varied between 20 to 25 hours. This indicates the stability of the sorbent toward reactivity during continuous sulfidation/regeneration cycles. Visual analysis of the sorbent after the tenth sulfidation indicated that there was no spalling, cracking, or other changes in the physical characteristics. This indicated that in addition to the high capacity, the durability of the sorbent was excellent. The average crush strength of the fresh sorbent was 7.98 pounds per pellet and 2.0 pounds per millimeter of the pellet. The average crush strength of the sulfided pellet after 10 sulfidation cycles was 14.2 pounds per pellet and 3.57 pounds per millimeter (66.5 pounds per inch) of the pellet.

The sorbent was tested in a high-pressure reactor (16" height and 2" diameter). The pellets with a diameter of about 0.2 inch were used at the top of the bed, while pellets of a diameter of 0.5 inch were used in the bottom of the bed. The reactor pressure was 150 psia (136.3 psig), the temperature of the bed was 537° C., and the superficial velocity of the gas was 1 ft/sec. The gas composition utilized in sulfidation was 800 ppm $H_2S$, 47.92% nitrogen, 9% steam, 7% carbon dioxide, 21% carbon monoxide, and 15% hydrogen. The regeneration was performed in six steps. During the regeneration, the peak bed temperature was 760° C., the reactor pressure was 24.7 psia (10 psig), and the superficial velocity of the gas was 1 ft/sec. The temperatures used in the six steps were 537° C., 579° C., 621° C., 662° C., 704° C., and 760° C., respectively. The gas composition varied from 2.5% oxygen and 97.5% nitrogen to 21% oxygen and 79% nitrogen during the six regeneration steps.

Breakthrough times for the six-cycle sulfidation/regeneration high-pressure tests were as follows:

| Sulfidation cycle | Breakthrough time (hours) |
|---|---|
| 1 | 4.0 |
| 2 | 7.0 |
| 3 | 7.0 |
| 4 | 9.5 |
| 5 | 10.0 |
| 6 | 10.0 |

The capacity of the current sorbent improved during the cyclic testing (first sulfidation cycle S1 to fifth cycle S5) and is clearly better than that of zinc titanate which has an acceptable capacity for the process. The sorbent was examined after the testing, and spalling, cracking, or any other physical deterioration characteristics were not observed. The severe spalling of zinc titanate sorbent was observed even after two and one-half cycles. This indicates that the current sorbent with high capacity and high durability performs well in the high-pressure environment.

After the six sulfidation cycles (performed with dry regeneration) in the high-pressure reactor, regeneration reaction in 20 subsequent cycles was performed utilizing steam in order to understand the effect of steam on the sorbent. The regeneration with steam was also performed in four stages. The gas compositions in the four stages were 0.5% to 7.0% oxygen, 50% steam, and 49.5% to 43% nitrogen. The temperatures of the four stages were 1,000° F., 1,075° F., 1,150° F., and 1,225° F. The results of the steam regeneration were as follows:

| Sulfidation cycle | Breakthrough time (hours) |
| --- | --- |
| 7 | 8.0 |
| 8 | 10.0 |
| 9 | 10.0 |
| 10 | 10.5 |
| 11* | 8.0 |
| 12 | 6.0 |
| 13 | 6.0 |
| 14 | 6.0 |
| 15 | 6.0 |
| 16 | 5.0 |
| 17 | 5.0 |
| 18 | 6.0 |
| 19 | 5.5 |
| 20 | 6.5 |

*some sorbent removal for analysis

After the eleventh sulfidation, a small amount of sorbent was removed from the reactor for chemical analysis. Thus, the small decrease in the sorbent reactivity between the eleventh and the twelfth cycles is due to the sorbent removal for chemical analysis. It is clear that there is no significant change in the sulfidation breakthrough curves (S7 to S20) following steam regeneration indicating that steam has no detrimental effect on the sorbent. This indicated that this sorbent can be utilized even in the presence of steam and is very stable in terms of both reactivity and physical durability during 20 cycles of testing. The sorbent was examined after the eleventh and twentieth sulfidations (six dry regenerations and rest steam regenerations), and spalling, cracking, or any other deterioration was not observed. The total sulfur analysis of the sorbent after 11 sulfidations indicated that weight percent of sulfur at the top of the bed was 9% and the bottom of the bed was 5%. The crush strength of the sulfided sorbent was more compared to that of the fresh sorbent.

EXAMPLE 2

Sorbent pellets 2–4 were prepared to contain the following components, in grams:

| Reactants | Sorbent 2 | Sorbent 3 | Sorbent 4 |
| --- | --- | --- | --- |
| ZnO | 2,000 | 2,000 | 2,000 |
| TiO$_2$ | 956 | 650 | 600 |
| SiO$_2$ (100–200 mesh) | 300 | 600 | 600 |
| Bentonite | 300 | 300 | 300 |
| CaSO$_2$ | 150 | 150 | 150 |
| Cu(NO$_3$)$_2$ | — | — | 100 |

These oxides were mixed in the mixer-pelletizer first, and a sufficient amount of water was added for the pelletization. The resulting pellets were heated in a vacuum oven at 150° C. for 16 hours. The pellets were calcined at 550° C. for 10 hours. The BET nitrogen surface area of the resulting sorbents 2, 3, and 4 were 37 m$^2$/g, 66 m$^2$/g, and 60 m$^2$/g, respectively. The crush strengths of these sorbents were 2.26, 2.95, and 2.69 pounds/mm, respectively.

Sorbent 4 was tested in a low-pressure fixed bed reactor (2" diameter×6" length) at 537° C. However, these sorbents (2–4) can also be used in fludized beds in which the pellet sizes are less than 500 microns. The composition of the gases was 0.2 (volume percent) H$_2$S, 21% CO, 15% H$_2$, 9% H$_2$O, and 7% CO$_2$. The total gas flow rate was 0.3 ft/sec (2,000 scfh/cf). The reactor inlet pressure was 23 psig. Breakthrough curves (plots of hydrogen sulfide concentration at the reactor outlet vs. time) were obtained for hydrogen sulfide, and the breakthrough time was defined as the time corresponding to 200 ppmv H$_2$S in the outlet gas. The regeneration of the sorbent was performed at 537° C. to 645° C. utilizing steam, nitrogen, and oxygen. The total gas flow rate was 0.13 to 0.15 ft/sec (900 scfh/cf). Regeneration was performed at three different stages with steam:nitrogen:oxygen concentrations varying from 50:49:1% to 50:46.5:3.5%. Regeneration was stopped when the SO$_2$ concentration in the outlet gas was 50 ppmv.

The results of the six-cycle sulfidation/regeneration tests with 2,000 ppm H$_2$S were as follows:

| Sulfidation cycle | Breakthrough time (hours) |
| --- | --- |
| 1 | 19.0 |
| 2 | 24.0 |
| 3 | 19.0 |
| 4 | 19.0 |
| 5 | 20.0 |
| 6 | 19.0 |

The breakthrough time defined as the time corresponding to 200 ppmv H$_2$S, increased at the second sulfidation cycle but decreased at the third sulfidation cycle and reached stabilization. The breakthrough times after reaching stabilization at the third cycle was about 19 hours. The initial hydrogen sulfide outlet concentration was 0 up to about 13 hours of operation. This indicates that this sorbent has an excellent sulfidation efficiency and will even be suitable for fuel cell type applications.

The above examples are merely illustrative and are not to be understood as limited to the scope of the invention, which is limited only as indicated by the appended claims.

I claim:

1. Sorbent pellets containing titanium oxide for removing hydrogen sulfide from a gas stream at a temperature of 800° F. to 1,200° F. comprising a mixture of the following components, in weight percent:

zinc oxide—30 to 60 titanium oxide—less than 40 silica gel—5 to 40

Bentonite—2 to 15 calcium sulfate—2 to 15 said mixture having been moistened with water, compressed into pellets, dried, and calcined under conditions wherein formation of zinc titanate is avoided.

2. The pellets as defined in claim 1 wherein said silica gel has a surface area of at least 700 m$^2$/gm.

3. The pellets as defined in claim 2 wherein said silica gel consists essentially of particles having sizes of 40 to 50 mesh and particles having a size of less than 100 mesh.

4. The pellets as defined in claim 1 wherein said pellets are calcined at a temperature of 550° C.

5. The pellets as defined in claim 1 further comprising $Cu(NO_3)_2$.

6. The pellets as defined in claim 5 wherein $Cu(NO_3)_2$ is provided at an amount of 2.6 weight percent.

7. The pellets as defined in claim 1 wherein said silica gel consists of equal amounts of particles within a first size range of 40 to 50 mesh and a second size range of −100 mesh, and said pellets are larger than 1 mm in diameter.

* * * * *